(12) United States Patent
Peled et al.

(10) Patent No.: US 12,276,897 B2
(45) Date of Patent: Apr. 15, 2025

(54) DYNAMIC CORRECTION FOR AN ACOUSTO-OPTIC DEFLECTOR

(71) Applicant: Orbotech Ltd., Yavne (IL)

(72) Inventors: Itay Peled, Jerusalem (IL); John Linden, Modiin (IL)

(73) Assignee: Orbotech Ltd., Yavne (IL)

( * ) Notice: Subject to any disclaimer, the term of this patent is extended or adjusted under 35 U.S.C. 154(b) by 408 days.

(21) Appl. No.: 17/903,734

(22) Filed: Sep. 6, 2022

(65) Prior Publication Data

US 2024/0094595 A1 Mar. 21, 2024

(51) Int. Cl.
G01J 1/42 (2006.01)
G02F 1/33 (2006.01)

(52) U.S. Cl.
CPC ............. *G02F 1/33* (2013.01); *G01J 1/4257* (2013.01); *G02F 2203/05* (2013.01)

(58) Field of Classification Search
CPC ...... G01S 7/4911; G01S 7/4817; G01S 17/32; G01S 7/4816; G01S 17/34; G02F 1/33; G02F 2203/05; G01J 1/4257
USPC .............................. 356/222, 141.4, 450–521
See application file for complete search history.

(56) References Cited

U.S. PATENT DOCUMENTS

| | | | |
|---|---|---|---|
| 4,656,347 A * | 4/1987 | Une | G03F 9/7049 250/237 G |
| 6,555,781 B2 | 4/2003 | Ngoi et al. | |
| 6,671,294 B2 | 12/2003 | Kroyan et al. | |
| 6,804,000 B2 | 10/2004 | Roorda et al. | |
| 7,483,196 B2 * | 1/2009 | Allen | G01J 1/4257 359/305 |
| 7,821,698 B2 | 10/2010 | Zeng et al. | |
| 2002/0023903 A1 | 2/2002 | Ann Ngoi et al. | |
| 2002/0176076 A1 | 11/2002 | Bouzid et al. | |
| 2009/0290209 A1 | 11/2009 | Kubo | |

(Continued)

FOREIGN PATENT DOCUMENTS

| | | |
|---|---|---|
| CN | 103592803 B | 8/2016 |
| CN | 108025396 B | 9/2020 |

(Continued)

OTHER PUBLICATIONS

Israel Patent Office, International Search Report and Written Opinion received in International Application No. PCT/IL2023/050948, Nov. 21, 2023, 9 pages.

(Continued)

*Primary Examiner* — Isiaka O Akanbi
(74) *Attorney, Agent, or Firm* — Suiter Swantz IP

(57) ABSTRACT

An optical scanner may include a sampler to receive an optical beam and provide a sampled beam including a portion of the optical beam, a dispersive element to spectrally disperse the sampled beam along a dispersion direction, one or more detectors to receive at least a portion of the sampled beam dispersed along the dispersion direction, one or more acousto-optic deflectors (AODs) configured to deflect the optical beam from the sampler, and a controller. The controller may determine a center of mass of the sampled beam dispersed along the dispersion direction based on signals from at least one of the one or more detectors, and generate a drive signal for at least one of the one or more AODs to deflect the optical beam from the sampler along a selected deflection angle based on the center of mass.

39 Claims, 7 Drawing Sheets

(56) References Cited

U.S. PATENT DOCUMENTS

| | | | |
|---|---|---|---|
| 2012/0044569 A1 | 2/2012 | Maak et al. | |
| 2012/0212791 A1 | 8/2012 | Okada | |
| 2013/0215404 A1* | 8/2013 | Den Boef | G03F 9/7026 |
| | | | 355/44 |
| 2015/0029578 A1 | 1/2015 | Rozsa et al. | |
| 2015/0346609 A1* | 12/2015 | Den Boef | G01N 21/9501 |
| | | | 359/888 |
| 2019/0317199 A1* | 10/2019 | Chong | G01S 17/32 |
| 2020/0217936 A1* | 7/2020 | Galloway | G01S 17/42 |
| 2022/0221796 A1 | 7/2022 | Xiong et al. | |
| 2024/0152022 A1* | 5/2024 | Peled | G02F 1/113 |

FOREIGN PATENT DOCUMENTS

| | | |
|---|---|---|
| JP | H04123329 A | 4/1992 |
| JP | H0651356 A | 2/1994 |
| JP | 7002407 B2 | 1/2022 |

OTHER PUBLICATIONS

Israel Patent Office, International Search Report and Written Opinion received in International Application No. PCT/IL2023/051118, Dec. 25, 2023, 11 pages.
U.S. Appl. No. 17/903,734, filed Sep. 6, 2022, Itay Peled.
U.S. Appl. No. 17/981,108, filed Nov. 4, 2022, Itay Peled.

* cited by examiner

DYNAMIC CORRECTION FOR AN ACOUSTO-OPTIC DEFLECTOR

TECHNICAL FIELD

The present disclosure is directed generally to an optical beam scanner and, more particularly, to dynamic corrections for an optical beam scanner in the presence of spectral variations of a scanned beam.

BACKGROUND

Acousto-optic deflectors (AODs) may be used as optical beam scanning devices in a wide range of applications. AODs beneficially provide relatively fast scanning speeds but are sensitive to spectral variations of an optical beam being scanned. It may therefore be desirable to develop systems and methods to cure the above deficiencies.

SUMMARY

An optical scanner is disclosed in accordance with one or more illustrative embodiments of the present disclosure. In one illustrative embodiment, the optical scanner includes a sampler to receive an optical beam and provide a sampled beam including a portion of the optical beam. In another illustrative embodiment, the optical scanner includes a dispersive element to spectrally disperse the sampled beam along a dispersion direction. In another illustrative embodiment, the optical scanner includes one or more detectors to receive at least a portion of the sampled beam dispersed along the dispersion direction. In another illustrative embodiment, the optical scanner includes one or more acousto-optic deflectors (AODs) to deflect the optical beam from the sampler. In another illustrative embodiment, the optical scanner includes a controller. In another illustrative embodiment, the controller determines a center of mass of the sampled beam dispersed along the dispersion direction based on signals from at least one of the one or more detectors. In another illustrative embodiment, the controller generates a drive signal for at least one of the one or more AODs to deflect the optical beam from the sampler along a selected deflection angle based on the center of mass.

A system is disclosed in accordance with one or more illustrative embodiments of the present disclosure. In one illustrative embodiment, the system includes an optical source configured to generate an optical beam. In another illustrative embodiment, the system includes a scanner. In another illustrative embodiment, the scanner includes a sampler to receive the optical beam and provide a sampled beam including a portion of the optical beam, a dispersive element to spectrally disperse the sampled beam along a dispersion direction, one or more detectors to receive at least a portion of the sampled beam dispersed along the dispersion direction, and one or more acousto-optic deflectors (AODs) to deflect the optical beam from the sampler. In another illustrative embodiment, the system includes a controller. In another illustrative embodiment, the controller determines a center of mass of the sampled beam dispersed along the dispersion direction based on signals from at least one of the one or more detectors. In another illustrative embodiment, the controller generates a drive signal for at least one of the one or more AODs to deflect the optical beam from the sampler along a selected deflection angle based on the center of mass. In another illustrative embodiment, the system includes one or more focusing optics configured focus the optical beam deflected by the one or more AODs to a sample.

A method is disclosed in accordance with one or more illustrative embodiments of the present disclosure. In one illustrative embodiment, the method includes generating a sampled beam from a received optical beam, where the sampled beam includes a portion of the optical beam. In another illustrative embodiment, the method includes spectrally dispersing the sampled beam along a dispersion direction. In another illustrative embodiment, the method includes detecting, with one or more detectors, at least a portion of the sampled beam dispersed along the dispersion direction. In another illustrative embodiment, the method includes determining a center of mass of the sampled beam dispersed along the dispersion direction based on signals from at least one of the one or more detectors. In another illustrative embodiment, the method includes generating a drive signal for an acousto-optic deflector (AOD) to deflect the optical beam along a selected deflection angle based on the center of mass. In another illustrative embodiment, the method includes deflecting the optical beam with the AOD driven by the drive signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
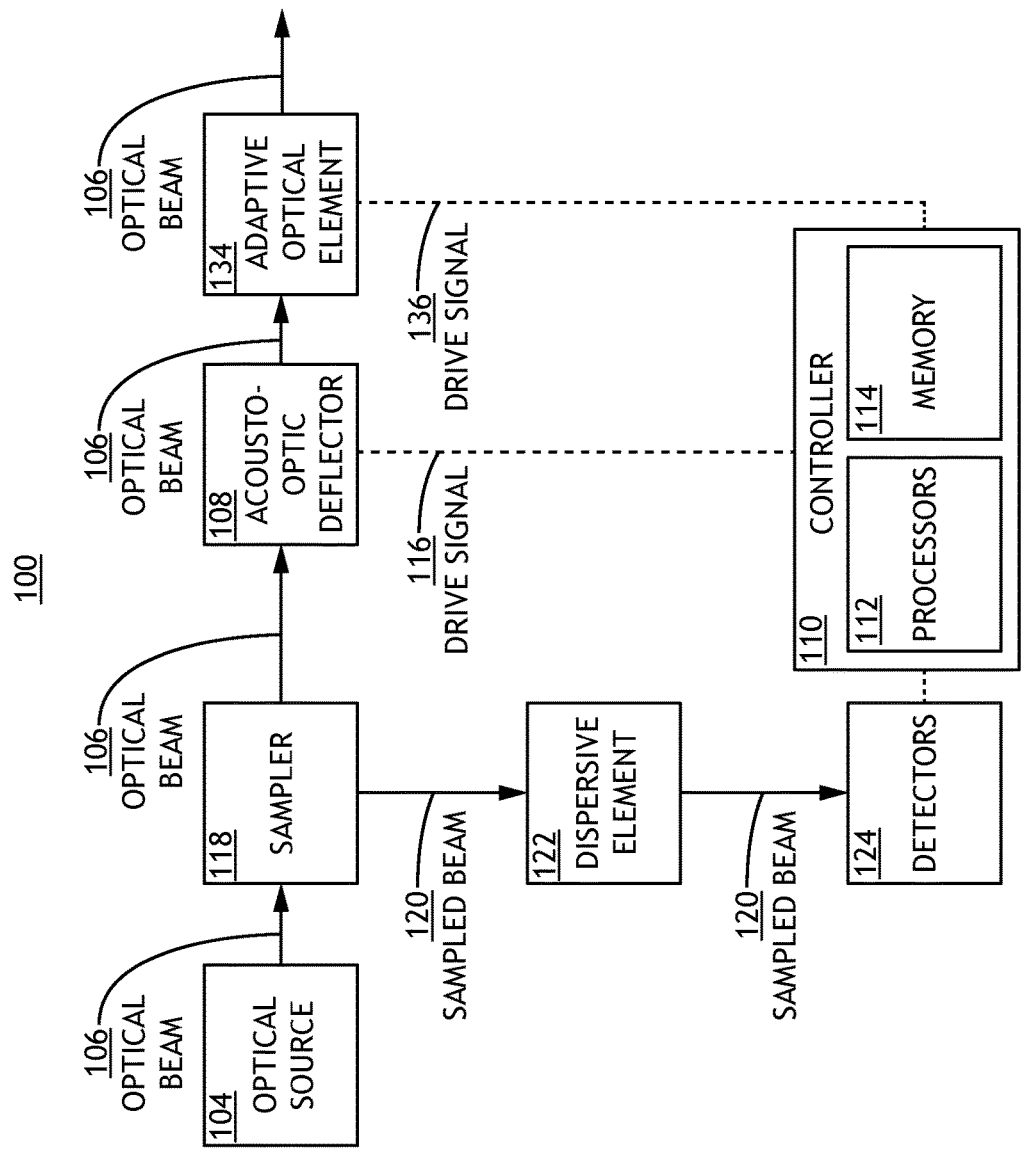
FIG. 1A is a block diagram of an optical scanner, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for dynamic control of an optical scanner to compensate for spectral variations of an optical beam (e.g., a laser beam, or the like).

In some embodiments, an optical scanner includes at least one acousto-optic deflector (AOD) to receive and redirect an optical beam (e.g., scan an optical beam), one or more detectors to monitor spectral variations of the optical beam, and a controller to provide a drive signal to the AOD that dynamically adjusts to compensate for spectral variations of the optical beam measurable by at least one of the one or more detectors.

An AOD may include one or more transducers to generate acoustic waves in a host material, where driving the transducers with a periodic drive signal may form a diffraction grating in the host material. In this way, an incident optical beam may be redirected via diffraction, where a deflection angle of the optical beam from the AOD (e.g., a diffraction angle from the diffraction grating) may be controlled based on a frequency of the drive signal and an intensity of the optical beam from the AOD may be controlled based on an amplitude of the drive signal.

It is contemplated herein that such an AOD may beneficially provide higher scanning speeds than mechanical scanners (e.g., galvo mirrors, rotating polygons, or the like), but may be highly sensitive to spectral variations of an optical beam being scanned. In particular, spectral variations of the optical beam may result in variations of a diffraction angle of the optical beam by the AOD and thus variations in the deflection angle of the optical beam. However, the systems and methods disclosed herein may allow for dynamic compensation of spectral variations to provide fast and accurate optical scanning with an AOD despite spectral variations.

Additional embodiments of the present disclosure are directed to systems and methods for dynamically compensating for power fluctuations of the optical beam when using wavelength-sensitive polarization optics. Some polarization optics may provide non-uniform performance (e.g., transmissivity and/or reflectivity) for different wavelengths. In this case, spectral variations of the optical beam may result in power fluctuations when such wavelength-sensitive polarization optics are used in an optical scanner. In some embodiments, the controller may further dynamically adjust an amplitude of a drive signal to an AOD to adjust a power of the optical beam exiting the AOD and thus compensate for power fluctuations associated with interaction with wavelength-sensitive polarization optics. Such wavelength-sensitive polarization optics may be placed before or after the AOD.

Additional embodiments of the present disclosure are directed to systems and methods for dynamically compensating for beam size variations of an optical beam. For example, beam size and positioning accuracy of an optical beam may be directly affected when the power distribution of the optical beam dynamically changes between different spectral bands. Further, it may be the case that spectral variations of the optical beam are associated with operation of an associated optical source (e.g., a laser source) in different optical modes, where each optical mode may also provide different beam characteristics (e.g., beam size, beam divergence, or the like). In this way, switching between these different modes (e.g., mode hopping) and/or simultaneous lasing of different modes may result in any combination of spectral variations and/or variations in beam characteristics. In some embodiments, an optical scanner includes one or more detectors to monitor a beam size of an optical beam and one or more adaptive optics (e.g., a deformable mirror, a micro-electro-mechanical system (MEMS) device, a phase modulator, or the like), where the controller dynamically generates drive signals for the adaptive optics to compensate for variations of the beam size.

Referring now to FIGS. 1A-6, systems and methods for optical scanning in the presence of spectral variations and/or beam size variations are described in greater detail, in accordance with one or more embodiments of the present disclosure.

Figure 1B:
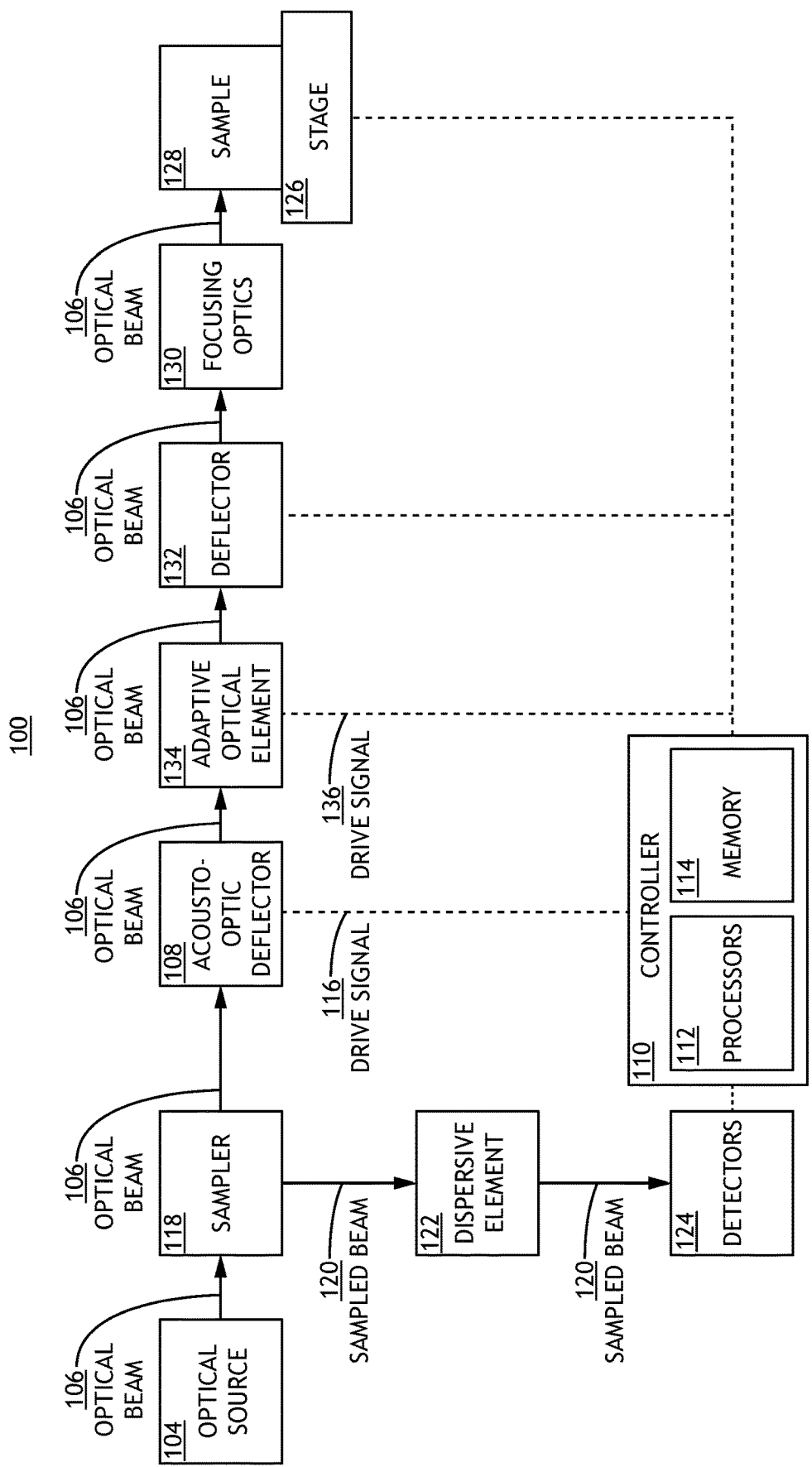
FIG. 1B is a block diagram of a system including an optical scanner, in accordance with one or more embodiments of the present disclosure.

FIG. 1A is a block diagram of an optical scanner 100, in accordance with one or more embodiments of the present disclosure. FIG. 1B is a block diagram of a system 102 including an optical scanner 100, in accordance with one or more embodiments of the present disclosure.

In some embodiments, the optical scanner 100 includes an optical source 104 to generate an optical beam 106 and at least one AOD 108 to control a deflection angle of the optical beam 106. The optical scanner 100 may further include a controller 110 with one or more processors 112 configured to execute a set of program instructions maintained in memory 114 (e.g., a memory device), where the controller 110 may generate at least one drive signal 116 for the AOD 108. In this way, the controller 110 may direct or otherwise control the AOD 108 to direct the optical beam 106 along a particular deflection angle, scan pattern, or the like based on the drive signal 116. As is described in greater detail below, the controller 110 may further adjust one or more aspects of the drive signal 116 to compensate for spectral variations of the optical beam 106 and provide a consistent deflection angle of the optical beam 106 by the AOD 108. For example, the optical scanner 100 may monitor spectral variations of the optical beam 106 by sampling a portion of the optical beam 106 with a sampler 118 to form a sampled beam 120, spectrally dispersing the sampled beam 120 with a dispersive element 122, and collecting at least a portion of the spectrally-dispersed sampled beam 120 with one or more detectors 124 coupled to the controller 110.

Additionally, although not explicitly shown in FIG. 1A, the optical scanner 100 may generally include any number of AODs 108. For example, the optical scanner 100 may include multiple AODs 108 arranged to provide scanning of the optical beam 106 along multiple directions (e.g., orthogonal directions). In the case of multiple AODs 108, the controller 110 may adjust one or more aspects of the drive signal 116 associated with each AOD 108 to compensate for spectral variations of the optical beam 106 and provide a consistent deflection angle of the optical beam 106 by each AOD 108. In this way, any description of the operation or correction of an AOD 108 herein may be extended to apply to multiple AODs 108.

The one or more processors 112 of a controller 110 may include any processor or processing element known in the art. In this sense, the one or more processors 112 may include any microprocessor-type device configured to execute algorithms and/or instructions. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 112 may include any device configured to execute algorithms and/or instructions (e.g., program instructions stored in memory). In some embodiments, the one or more processors 112 may be embodied as a desktop computer, mainframe computer system, workstation, image computer, parallel processor, networked computer, or any other computer system configured to execute a program configured to operate or operate in conjunction with the optical scanner 100, as described throughout the present disclosure. Moreover, different subsystems of the optical scanner 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 110 may include one or more controllers housed in a common housing or within multiple housings. In this way, any controller or combination of controllers may be separately packaged as a module suitable for integration into the optical scanner 100.

The memory 114 may include any storage medium known in the art suitable for storing program instructions executable by the associated one or more processors 112. For example, the memory 114 may include a non-transitory memory medium. By way of another example, the memory 114 may include, but is not limited to, a read-only memory (ROM), a random-access memory (RAM), a magnetic or optical memory device (e.g., disk), a magnetic tape, a solid-state drive and the like. It is further noted that the memory 114 may be housed in a common controller housing with the one or more processors 112. In some embodiments, the memory 114 may be located remotely with respect to the physical location of the one or more processors 112 and the controller 110. For instance, the one or more processors 112 of the controller 110 may access a remote memory (e.g., server), accessible through a network (e.g., internet, intranet and the like).

As another example, the controller 110 may include or be coupled with one or more encoders (e.g., optical encoders), which may be used for any suitable purposes including, but not limited to, monitoring a position of the optical beam along one or more scan axes and providing associated feedback for control.

The optical scanner 100 may be integrated into any suitable system for dynamic beam control. As an illustration, FIG. 1B depicts the use of the optical scanner 100 in a system 102 suitable for materials processing. In some embodiments, the system 102 includes a stage 126 to secure a sample 128. In some embodiments, the system 102 includes one or more focusing optics 130 to focus the optical beam 106 from the optical scanner 100 onto the sample 128. Accordingly, the system 102 may direct or scan an optical beam 106 across the sample 128 in any pattern, where the AOD 108 within the optical scanner 100 is adjusted to compensate for spectral variations of the optical beam 106 such that the position of the optical beam 106 on the sample 128 may be consistent despite the spectral variations.

The focusing optics 130 may include any number or type of focusing optics suitable for focusing the optical beam 106 onto the sample 128. In some embodiments, the focusing optics 130 include an F-theta lens to provide consistent focusing of the optical beam 106 across a flat plane and linear displacement across the sample 128 as a function of input angle (e.g., associated with the deflection angle of the optical beam 106 from the optical scanner 100).

In some embodiments, the system 102 includes one or more additional components to provide additional control over the position of the optical beam 106 on the sample 128. For example, the stage 126 may include a translation stage with one or more linear or angular actuators to adjust a position of the sample 128 along any number of degrees of freedom. As another example, the system 102 may include an additional deflector 132 such as, but not limited to, a galvo mirror as depicted in FIG. 1B, a rotating polygon, or an additional AOD. In this way, the scanning range may be increased beyond the range of the optical scanner 100. For instance, mechanical beam scanners such as the stage 126 or the galvo mirror depicted in FIG. 1B may provide a larger scanning range than the optical scanner 100 but with relatively slower scan rates.

The system 102 may further include any number of additional optics to control various aspects of the optical beam 106 such as, but not limited to, optical relays, beam expanders, polarizers, spectral filters, spatial filters, or apodizers. Although not explicitly illustrated, such additional optics may be distributed at any suitable locations throughout the system 102 and/or within the optical scanner 100.

In some embodiments, the system 102 and/or the optical scanner 100 further includes an adaptive optical element 134 providing spatially-resolved control over portions of the optical beam 106. In this way, properties such as, but not limited to, beam size, beam divergence, or focal properties of the optical beam 106 deflected by the AOD 108 may be adjusted to provide consistent performance despite variations of the optical beam 106. For example, the adaptive optical element 134 may be used within the system 102 to provide a consistent focused spot size on the sample 128 despite variations of the optical beam 106.

Referring now generally to FIG. 1A, various aspects of the optical scanner 100 are described in greater detail, in accordance with one or more embodiments of the present disclosure.

The optical beam 106 may include one or more selected wavelengths of light including, but not limited to, ultraviolet (UV) radiation, visible radiation, or infrared (IR) radiation. Further, the optical beam 106 from the optical source 104 may have any temporal profile including, but not limited to, a continuous-wave (CW) profile, a pulsed profile, or a modulated profile.

The optical source 104 may generally include any type of illumination source suitable for providing at least one optical beam 106 including, but not limited to, a laser source or a light emitting diode (LED). It is noted that the optical source 104 may be integrated within the optical scanner 100, the system 102, or as an external component. In some embodiments, the optical source 104 includes a narrowband laser source providing light centered around a center wavelength. It is contemplated herein that the smaller a bandwidth of the optical beam 106, the less spatial dispersion will be induced by a dispersive element such as, but not limited to, an AOD 108.

In some embodiments, the optical source 104 is a carbon dioxide ($CO_2$) laser source. For example, a $CO_2$ laser may provide an optical beam 106 having a wavelength in a range of 9-12 nanometers, though this is indented to be illustrative rather than limiting.

Figure 2:
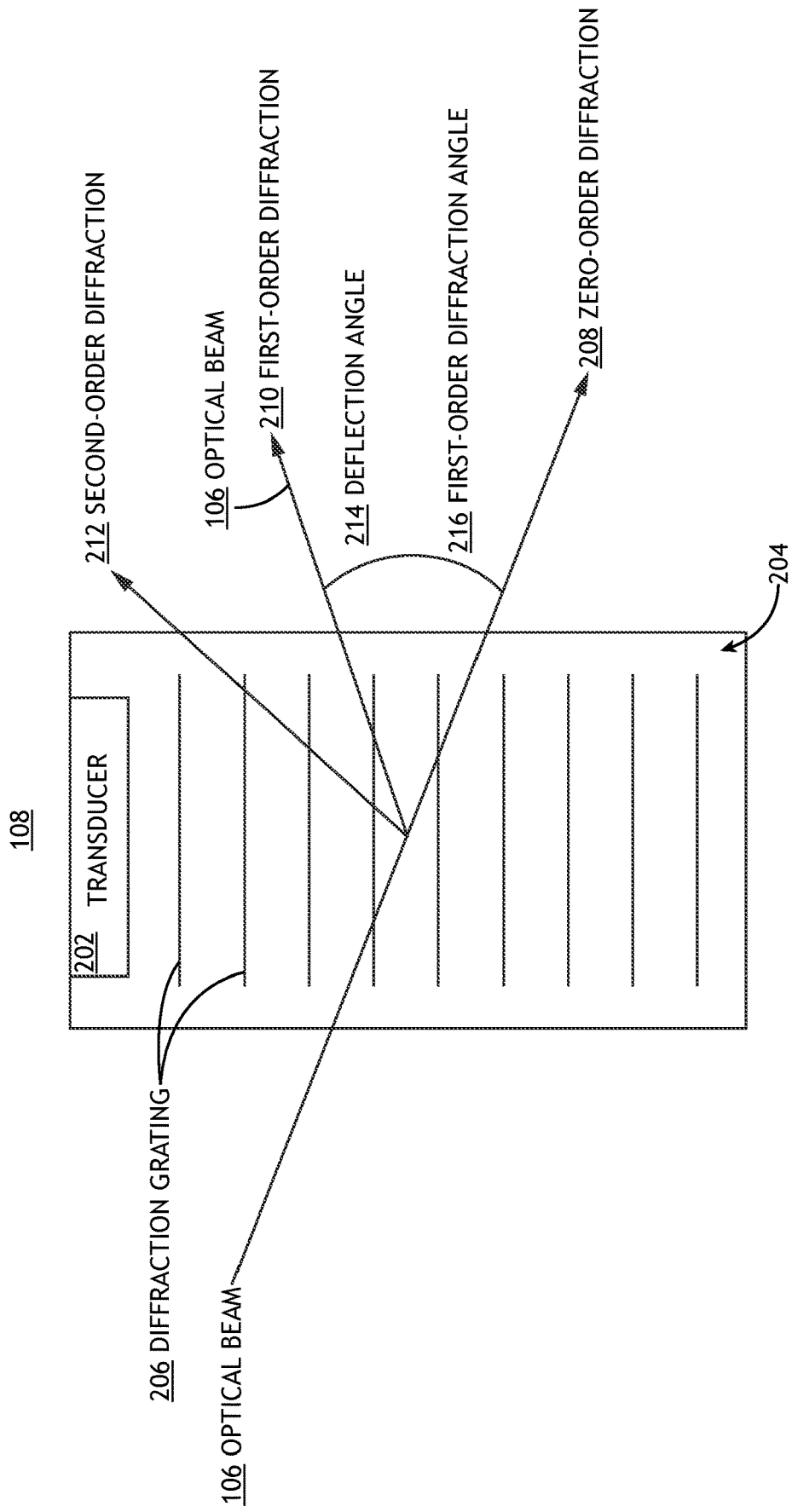
FIG. 2 is a simplified schematic of an acousto-optic deflector (AOD), in accordance with one or more embodiments of the present disclosure.

The AOD 108 may include any type of deflector known in the art suitable for controlling a deflection angle of the optical beam 106 through diffraction by acoustic waves in a material. FIG. 2 is a simplified schematic of an AOD 108, in accordance with one or more embodiments of the present disclosure.

In some embodiments, the AOD 108 includes at least one transducer 202 coupled to a host material 204. The host material 204 may include any type of material suitable for interaction with the optical beam 106 such as, but not limited to, a glass or a crystal. For example, the host material 204 may be transparent to the optical beam 106. As an illustration, the host material 204 may have an absorptivity for wavelengths associated with the optical beam 106 below a selected threshold and/or may have a transmissivity for wavelengths associated with the optical beam 106 above a selected threshold.

A transducer 202 may be any component suitable for generating acoustic waves in the host material 204. In some embodiments, A transducer 202 is a piezoelectric material that may expand or contract in response to an applied voltage (e.g., a drive signal 116), which may generate an acoustic wave in the host material 204.

In some embodiments, the AOD 108 (e.g., one or more transducers in an AOD 108) is driven by a periodic drive signal 116 to generate a periodic distribution of acoustic waves in the host material 204, which may operate as a diffraction grating 206 suitable for diffracting the optical beam 106. In particular, the periodic distribution of acoustic waves may provide a periodic distribution of refractive index in the host material 204 that operates as a diffraction grating 206.

Diffraction of the optical beam 106 by the diffraction grating 206 may generally result in any number of diffraction orders (e.g., zero-order diffraction 208, first-order diffraction 210, second-order diffraction 212, or the like). In this configuration, any of the diffraction orders may be utilized as a deflected optical beam 106. In some embodiments, the AOD 108 is configured such that the optical beam 106 interacts with the diffraction grating 206 at or near the Bragg angle such that a substantial portion of the energy in the optical beam 106 is diffracted as first-order diffraction 210 (e.g., +1 order diffraction or −1 order diffraction). Accordingly, the first-order diffraction 210 may represent a deflected optical beam 106 and a deflection angle 214 of the optical beam 106 from the AOD 108 may correspond to the first-order diffraction angle 216.

Diffraction of the optical beam 106 by the diffraction grating 206 in the AOD 108 may generally be governed by the grating equation:

$$d(\sin \theta_i - \sin \theta_m) = m\lambda \quad (1)$$

where d is the period of the diffraction grating 206, m is the diffraction order, $\lambda$ is the wavelength of the optical beam 106, $\theta_i$ is the incidence angle of the optical beam 106, and $\theta_m$ is the diffraction angle of the associated diffraction order of the optical beam 106. The first-order diffraction angle 216 is thus $$\theta_1 = a\sin(\sin \theta_i - \lambda/d) \quad (2)$$

and varies based on the wavelength ($\lambda$) of the optical beam 106 as well as the period (d) of the diffraction grating 206. More generally, Equation (1) illustrates that non-zero diffraction orders including, but not limited to, first-order diffraction 210 are spectrally dispersed such that the angle of diffraction $\theta_m$ varies based on the wavelength ($\lambda$) of the optical beam 106.

The power of the first-order diffraction 210 and thus the efficiency of the AOD 108 for deflecting the optical beam 106 may depend on various factors including, but not limited to, the magnitude of the variation of refractive index of the host material 204 ($\Delta n$, where n is the refractive index of the host material 204) associated with the diffraction grating 206, which may be referred to as the modulation depth of the diffraction grating 206. In an AOD 108, this modulation depth ($\Delta n$) may be based on an amplitude of an acoustic wave generated by the transducer 202.

For a given wavelength ($\lambda$) of the optical beam 106, the first-order diffraction angle 216 and thus the deflection angle 214 of the optical beam 106 from the AOD 108 may be varied within a scan range (e.g., a walking window) by adjusting a frequency of the drive signal 116. The period (d) of the diffraction grating 206 may be inversely related to the frequency of the drive signal 116. For example, the controller 110 may generate the drive signal 116 and may adjust the frequency of the drive signal 116 in any selected pattern to adjust the deflection angle 214 in any selected pattern.

It is contemplated herein that the optical source 104 may exhibit various instabilities such as, but not limited to, instabilities in the spectrum or the beam size of the optical beam 106. In the case of a laser source, such instabilities may be, but are not required to be, associated with mode hopping between different supported modes, each of which may have a different wavelength (e.g., central wavelength).

Spectral variations of the optical beam 106 (e.g., associated with such instabilities of the optical source 104 or more generally associated with any mechanism) may induce errors of the deflection angle of the optical beam 106. Considering the illustration in FIG. 2 as a non-limiting example, spectral variations of the optical beam 106 may affect the first-order diffraction angle 216 and thus the deflection angle 214 of the optical beam 106 from the AOD 108 based on Equations (1) and (2). As a result, a shift of the wavelength ($\lambda$) of the optical beam 106 from an expected value (e.g., due to a spectral variation) may result in an error of the deflection angle 214 from the AOD 108.

While it may be possible to avoid such deflection angle errors by either using a wavelength insensitive scanning technique (e.g., a mechanical technique such as, but not limited to, galvo mirrors or rotating polygons) or selecting an optical source 104 having reduced spectral variations, such approaches are not always desirable. For example, mechanical beam scanning techniques may generally have slower positioning rates (e.g., scan rates) and may thus limit the throughput of a system. As another example, techniques providing an optical beam 106 with high spectral stability may limit the achievable power of the optical beam 106. Put another way, mode hopping (and the associated spectral instability) may be a consequence of high-power operation of some laser sources such as, but not limited to $CO_2$ laser sources.

Accordingly, it may be desirable in some applications to utilize an optical scanner 100 including an AOD 108 in combination with an optical source 104 exhibiting spectral variations. In this way, the optical source 104 may be selected to provide an optical beam 106 with a selected power without regard to spectral instabilities and without sacrificing scanning speed or precision.

Referring again to FIGS. 1A-1B, in some embodiments, the optical scanner 100 includes various components to compensate for spectral variations of the optical beam 106.

In some embodiments, the optical scanner 100 includes a sampler 118 to generate a sampled beam 120 from the optical beam 106, a dispersive element 122 to spectrally disperse the sampled beam 120, and one or more detectors 124 to capture at least a portion of the spectrally-dispersed sampled beam 120. In this way, the one or more detectors 124 may generate signals indicative of the spectral variations of the sampled beam 120 and thus the spectral variations of the optical beam 106. The controller 110 may then adjust the drive signal 116 of the AOD 108 to compensate for the spectral variations of the optical beam 106 over time to provide an accurate deflection angle 214 of the optical beam 106 despite the spectral variations.

The sampler 118 may include any optical component known in the art suitable for extracting a portion of the optical beam 106 as a sampled beam 120. For example, the sampler 118 may include, but is not limited to, an optical wedge or a beamsplitter. As another example, the sampler 118 may include a mirror providing less than 100% reflectance, where a portion of the optical beam 106 propagates through the mirror and is utilized as the sampled beam 120.

The dispersive element 122 may include any optical element known in the art suitable for spatially dispersing the sampled beam 120 such as, but not limited to, a diffraction grating or a prism. In this way, the dispersive element 122 (and the detector 124) may be an in-line or real-time spectrometer. For example, in the case of a diffraction grating, the dispersive element 122 may generate multiple diffraction orders based on Equation (1), where non-zero diffraction orders are spectrally dispersed. In some embodiments, as described with respect to the diffraction grating 206 of the AOD 108, the dispersive element 122 is arranged to satisfy the Bragg condition such that a substantial portion of the power of the sampled beam 120 is diffracted as first-order diffraction.

The dispersive element 122 may generally have any dispersion value. In some embodiments, the dispersive element 122 has sufficient dispersion to enable the detection of spectral variations of the sampled beam 120 by at least one of the one or more detectors 124. As an illustration, the dispersive element 122 may include, but is not required to include, a diffraction grating with a ruling of 150 lines per millimeter to provide sufficient dispersion to enable the detection of spectral variations of the sampled beam 120 by at least one of the one or more detectors 124.

Figure 3:
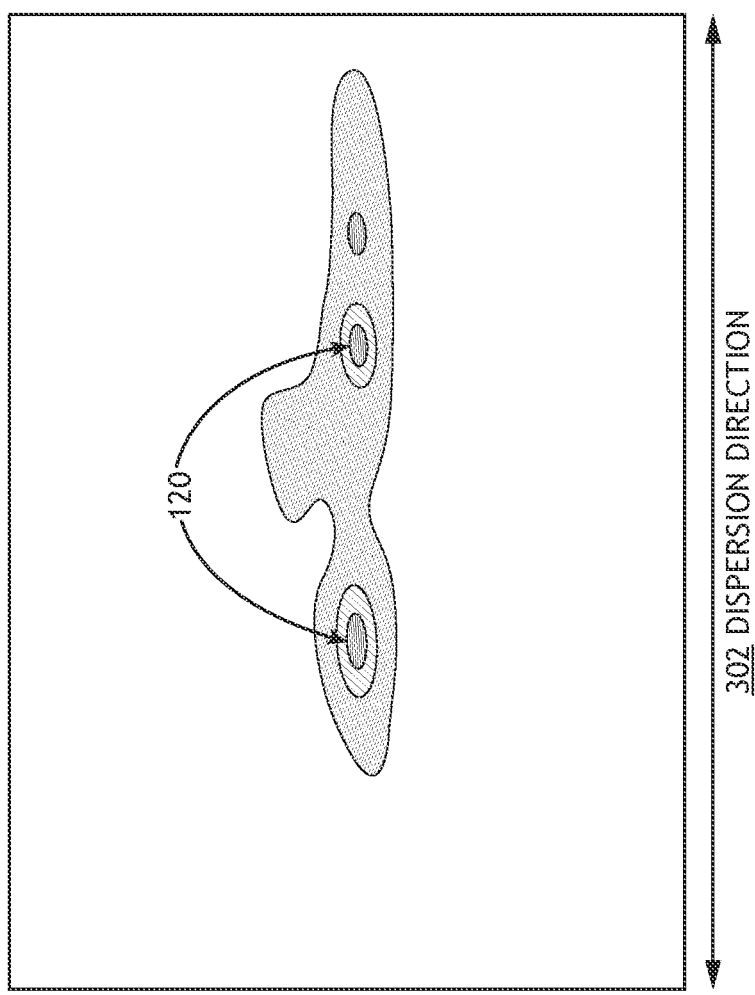
FIG. 3 is a plot of a spatially dispersed sampled beam, in accordance with one or more embodiments of the present disclosure.

FIG. 3 is a plot of a spatially dispersed sampled beam 120, in accordance with one or more embodiments of the present disclosure. In particular, FIG. 3 corresponds to a plot of a spatially dispersed sampled beam 120 associated with a $CO_2$ laser and depicts light dispersed along a dispersion direction 302.

Spectral variations of an optical beam 106 may manifest in multiple ways and may depend on the particular optical source 104. In some embodiments, the optical beam 106 may include power centered around a single wavelength (e.g., a single central wavelength), where this wavelength may shift over time. For example, such behavior may be associated with, but is not limited to, thermal variations in the optical source 104. In some embodiments, as depicted in FIG. 3, an optical source 104 may generate an optical beam 106 having power centered around one or more wavelengths associated with one or more optical modes. In this way, any number of optical modes (and associated wavelengths) may be present at any particular time and the distribution of wavelengths may change over time (e.g., due to mode hopping)

The one or more detectors 124 may include any type of detector known in the art suitable for detecting spectral variations of the sampled beam 120 when coupled with the dispersive element 122. In some embodiments, a detector 124 is formed as a multi-pixel detector, where at least two of the pixels are distributed along the dispersion direction 302 provided by the dispersive element 122. In this way, different pixels of the detector 124 along the dispersion direction 302 may capture different wavelengths or wavelength ranges of the sampled beam 120.

Lateral shifts of light along the dispersion direction 302 as measured by a detector 124 may be calibrated to wavelength shifts of the sampled beam 120 based on the value of the dispersion provided by the dispersive element 122 and a separation distance between the dispersive element 122 and the detector 124. For example, the value of the dispersion provided by the dispersive element 122 may be characterized as $\Delta\theta/\Delta\lambda$, where $\Delta\theta$ is an angular shift of the deflection angle 214 associated with a wavelength shift of $\Delta\lambda$. This may then be mapped to a linear shift $\Delta l$ on the detector 124.

The controller 110 may then provide a drive signal 116 to the AOD 108 using any technique suitable for compensating for spectral variations of the optical beam 106 (e.g., as measured on the sampled beam 120). In some embodiments, the controller 110 determines a center of mass (COM) of the spectrally dispersed sampled beam 120 and dynamically adjusts a frequency of a drive signal 116 to the AOD 108 based on the COM of the spectrally dispersed sampled beam 120.

As an illustration, the controller 110 may calculate a first frequency ($f_0$) of a drive signal 116. This first frequency may be selected to provide a desired deflection angle 214 for the optical beam 106 based on an expected wavelength ($\lambda_0$) of the sampled beam 120 and thus based on an expected COM ($COM_0$) of the spectrally-dispersed sampled beam 120 as measured by a detector 124.

The expected COM ($COM_0$) of the spectrally-dispersed sampled beam 120 may correspond to any value and may correspond to a center position on the detector 124. For example, if a spectrum of the optical beam 106 (and thus the sampled beam 120) varies within a known spectral range, the associated COM of the spectrally-dispersed sampled beam 120 may vary within a known range of positions on a plane of the detector 124. The detector 124 may then be placed at any suitable location to capture this known range of positions. In some embodiments, a center of the detector 124 is placed in a center of this known range of positions.

The controller 110 may receive signals from the detector 124 indicating the COM of the spectrally-dispersed sampled beam 120. The controller 110 may then determine an adjustment frequency ($\Delta f$) required to compensate for shifts of the COM of the spectrally-dispersed sampled beam 120 from the expected value ($\Delta COM$).

The controller 110 may then provide a drive signal 116 to the AOD 108 with a second frequency ($f_2$) corresponding to the first frequency ($f_1$) plus or minus an adjustment frequency ($\Delta f$) based on any measured deviation of the COM of the spectrally-dispersed sampled beam 120 from the expected value ($\Delta COM$).

It is contemplated herein adjusting a frequency of the drive signal 116 based on deviations of a COM of the spectrally-dispersed sampled beam 120 may provide a robust and efficient technique suitable for compensating for a wide variety of spectral variations. However, a detector 124 placed after the dispersive element 122 need not necessarily resolve spectral power in each optical mode or at each particular wavelength of the sampled beam 120. Rather, a COM of the spectrally-dispersed sampled beam 120 may provide an indicator of spectral variation in a manner relevant to compensation of the impact of spectral variation on the deflection angle 214.

For example, in the case that the spectrum of the sampled beam 120 (and thus the optical beam 106) includes power centered around a single center wavelength that shifts over time, the COM of the sampled beam 120 may correspond to this center wavelength such that the frequency of the drive signal 116 ($f_2$) may be adjusted to track this center wavelength.

As another example, in the case that the spectrum of the sampled beam 120 is more complex and includes power at multiple wavelengths that shift over time, the COM of the sampled beam 120 may correspond to an effective central wavelength of spectral power distribution. In some cases, the sampled beam 120 may not have any power at this effective central wavelength. However, adjusting the deflection angle 214 of the optical beam 106 based on this effective central wavelength may provide accurate optical scanning based on the effective center wavelength of the spectral power distribution.

Figure 4A:
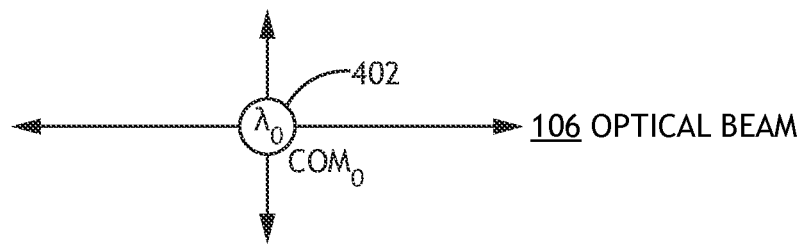
FIG. 4A is a simplified conceptual schematic of a first spectrally-dispersed sampled beam including a single lobe associated with a first wavelength, in accordance with one or more embodiments of the present disclosure.
Figure 4B:
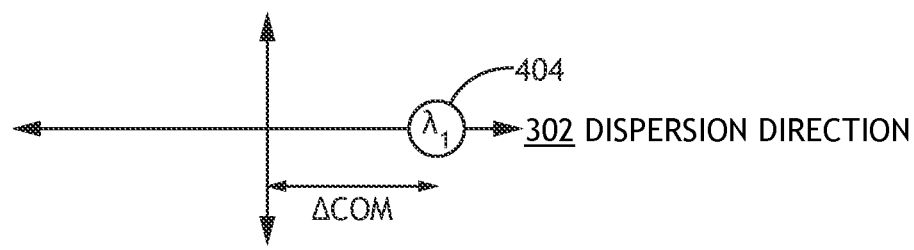
FIG. 4B is a simplified conceptual schematic of a second spectrally-dispersed sampled beam including a single lobe associated with a second wavelength, in accordance with one or more embodiments of the present disclosure.
Figure 4C:
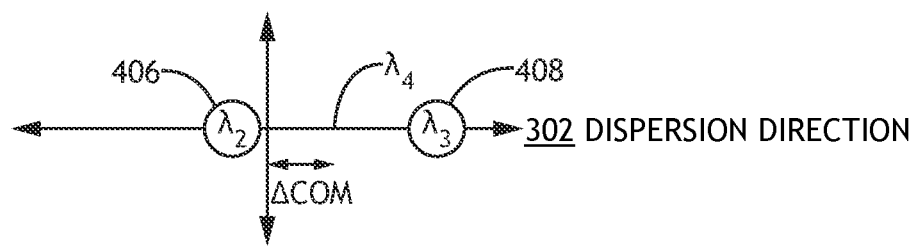
FIG. 4C is a simplified conceptual schematic of a third spectrally-dispersed sampled beam including a first lobe associated with a third wavelength and a second lobe associated with a fourth wavelength, in accordance with one or more embodiments of the present disclosure.

As an illustration, FIGS. 4A-4C depict a variation of the COM of a sampled beam 120 in response to various spectral variations, in accordance with one or more embodiments of the present disclosure. FIG. 4A is a simplified conceptual schematic of a first spectrally-dispersed sampled beam 120 including a single lobe 402 associated with a first wavelength ($\lambda_0$), in accordance with one or more embodiments of the present disclosure. FIG. 4B is a simplified conceptual schematic of a second spectrally-dispersed sampled beam 120 including a single lobe 404 associated with a second wavelength ($\lambda_1$), in accordance with one or more embodiments of the present disclosure. FIG. 4C is a simplified conceptual schematic of a third spectrally-dispersed sampled beam 120 including a first lobe 406 associated with a third wavelength ($\lambda_2$) and a second lobe 408 associated with a fourth wavelength ($\lambda_3$), in accordance with one or more embodiments of the present disclosure.

In FIGS. 4A-4C, the lobes 402-408 each have a symmetric power distribution (not illustrated) and the same physical size. In FIGS. 4A and 4B, the lobes 402,404 each contain the full power of the sampled beam 120. In FIG. 4C, the power of the sampled beam 120 is evenly distributed between the lobes 406,408.

In FIG. 4A, the COM of the sampled beam 120 may correspond to a center of the lobe 402. Further, the center of the lobe 402 may correspond to a physical center of the detector 124, which may correspond to an expected COM position ($COM_0$). In this situation, FIG. 4A may correspond to a case in which no compensation to the frequency of the drive signal 116 is needed.

In FIG. 4B, the COM of the spectrally-distributed sampled beam 120 may correspond to a center of the lobe 404. This situation may correspond to a simple shift of the center wavelength of the sampled beam 120 to $\lambda_1$ relative to $\lambda_0$ and a corresponding COM shift ($\Delta COM$) of the spectrally-distributed sampled beam 120. Accordingly, the controller 110 may provide a frequency adjustment ($\Delta f$) to compensate for the COM shift ($\Delta COM$).

In FIG. 4C, the COM of the spectrally-distributed sampled beam 120 may correspond to an additional wavelength $\lambda_4$, where the sampled beam 120 may or may not provide light at this wavelength. For example, FIG. 4C illustrates two lobes at wavelengths $\lambda_2$ and $\lambda_3$, where the COM corresponds to the additional wavelength $\lambda_4$ located between the two lobes. In any case, this wavelength $\lambda_4$ may correspond to a COM of the spectral power distribution of the sampled beam 120 and may thus provide a convenient wavelength to use as a basis for adjusting the frequency of the drive signal 116 for deflecting the optical beam 106. Although various portions of the optical beam 106 may have different deflection angles 214, a COM associated with the power of the optical beam 106 may be associated with this additional wavelength $\lambda_4$.

Referring generally to FIGS. 4A-4C, it is to be understood that FIGS. 4A-4C and the associated descriptions are provided merely for illustrative purposes and should not be interpreted as limiting. Rather, the spectrally-distributed sampled beam 120 may have any distribution across the detector 124.

Referring again to FIG. 1A, the optical scanner 100 may include any type of detector 124 suitable for determining a COM of the spectrally-distributed sampled beam 120.

In some embodiments, a detector 124 includes a multi-pixel sensor array such as, but not limited to, a line sensor for 1D measurements or an area sensor for 2D measurements. For example, the detector 124 may be formed as, but is not limited to, a complementary metal-oxide-semiconductor (CMOS) sensor, a charge-coupled device (CCD), or an array of single-pixel photodiodes. The COM of the spectrally-distributed sampled beam 120 may be determined using any suitable technique. For instance, each pixel may correspond to a range of wavelengths of the sampled beam 120 such that the COM may be determined based on the signal amplitudes of the various pixels.

In some embodiments, a detector 124 includes a position-sensitive sensor such as, but not limited to a segmented sensor or a lateral effect photodiode. For example, a segmented sensor may include one or more pixels in each of two or more segments. In this way, the COM of the incident light may be determined by relative ratios of signals in each segment. As an illustration, a segmented sensor with two segments distributed along the dispersion direction 302 may provide a one-directional measurement of the COM along the dispersion direction 302. As another illustration, a segmented sensor with four segments arranged as quadrants may provide a two-directional measurement and may be suitable for, but is not limited to, accounting for misalignments between the detector 124 and the dispersive element 122. By way of another example, a lateral effect photodiode may include a single extended photodiode element with multiple contacts, where a COM of incident light may be determined based on relative signals from the multiple contacts.

It is contemplated herein that a position-sensitive sensor may typically provide a faster readout time than a multi-pixel sensor array due to a relatively smaller number of pixels and/or readout efficiencies. As a result, a position-sensitive sensor may enable relatively faster sampling rates of the sampled beam 120 and thus enable relatively faster corrections to the frequency of the drive signal 116 than a multi-pixel sensor array. However, a multi-pixel sensor array may provide a more precise measurement of the spectral distribution of the sampled beam 120 than a position-sensitive sensor. Accordingly, the optical scanner 100 may include any combination of position-sensitive sensors or multi-pixel sensor arrays.

It is further contemplated herein that a 1D measurement may be sufficient to provide compensation of multiple AODs

108 along multiple scan axes. 2D measurements may be suitable for a configuration in which the optical beam 106 is sampled after the AODs 108 and frequency corrections are done in a closed loop to return the COM to the 2D center on an imaged plane of the AOD 108 plane (e.g., after a beam sampler and an optical relay).

In some embodiments, the optical scanner 100 and/or the system 102 includes an adaptive optical element 134 providing spatially-adjustable control of different portions of the optical beam 106. For example, the adaptive optical element 134 may include, but are not limited to, a deformable mirror, a MEMS device, a spatial light modulator (SLM), or a piezoelectric mirror (or mirror pair). The adaptive optical element 134 may be suitable for controlling any beam parameter such as, but not limited to, a beam size, a beam divergence, or a beam propagation direction.

The optical scanner 100 may include adaptive optical element 134 at any suitable location. For example, as illustrated in FIGS. 1A-1B, adaptive optical element 134 may be located in a path of the optical beam 106 after the AOD 108 to modify one or more properties of the optical beam 106 after deflection by the AOD 108. Further, the adaptive optical element 134 may be communicatively coupled with the controller 110 such that the controller 110 may provide a drive signal 136 to the adaptive optical element 134 to control one or more aspects of the adaptive optical element 134. As an illustration, the controller 110 may adjust the drive signal 136 for the adaptive optical element 134 based on signals from any of the one or more detectors 124.

In some embodiments, the adaptive optical element 134 provide an adjustable optical power. For example, the adaptive optical element 134 may operate as a lens with an adjustable focal length. In this way, the adaptive optical element 134 may provide an adjustable optical power based on a spectrum of the optical beam 106 (e.g., as measured by the sampled beam 120). Further, the adaptive optical element 134 may provide a different optical power along two directions (e.g., along two scanning direction). In this way, the adaptive optical element 134 may operate as a cylindrical focusing element.

It is contemplated herein that various instabilities of the optical beam 106 may result in variations of a spot size and/or divergence of the optical beam 106 after deflection by an AOD 108. For example, in a case where the optical beam 106 includes light at multiple wavelengths, different wavelengths will have different deflection angles 214 from the AOD 108 (e.g., based on Equation (1)). This may be true even if the frequency of the drive signal 116 for the AOD 108 has been adjusted as described previously herein. As a result, spectral variations of the optical beam 106 may result in varying beam divergence from the AOD 108. As another example, it may be the case that different optical modes of the optical source 104 may produce an optical beam 106 with a different spot size, beam profile, and/or divergence due to different mode profiles in the optical source 104. In this way, various aspects of the optical beam 106 prior to AOD 108 may vary.

Accordingly, the optical power of the adaptive optical element 134 may be adjusted (e.g., by a drive signal 136 provided by the controller 110) to provide consistent beam properties (e.g., divergence, spot size, beam profile, or the like) despite variations of the optical beam 106.

As an illustration, the optical power of the adaptive optical element 134 may be adjusted based on the signals from one or more detectors 124 to provide a collimated optical beam 106 despite variations of the optical beam 106.

As another illustration in the context of the system 102 illustrated in FIG. 1B, the optical power of the adaptive optical element 134 may be adjusted based on the signals from one or more detectors 124 to provide a consistent focused spot size on the sample 128 (e.g., in conjunction with additional components such as the focusing optics 130 or the additional optics).

It is contemplated herein that the controller 110 may utilize any type of detector 124 for modifying the drive signal 136 to the adaptive optical element 134. In some embodiments, the controller 110 utilizes a multi-pixel sensor array (e.g., a line sensor, an array sensor, or the like) to take advantage of the additional information provided by such a sensor. For instance, it may be desirable to adjust the optical power of the adaptive optical element 134 based on a spectral width of the sampled beam 120, which may impact the overall divergence of the optical beam 106 from the AOD 108 along a scan direction. Accordingly, the increased spectral resolution provided by a multi-pixel sensor array may facilitate a more sensitive measurement of the spectral width than a position-sensitive detector. However, it is to be understood that this is simply an illustration and should not be interpreted as limiting. In some cases, the controller 110 may utilize signals from a position-sensitive detector to adjust the drive signal 136 to the adaptive optical element 134.

Referring now again generally to FIGS. 1A and 1B, various additional aspects of the optical scanner 100 are described in greater detail, in accordance with one or more embodiments of the present disclosure.

In some embodiments, the optical scanner 100 includes one or more components suitable for monitoring the performance of the AOD 108. For example, thermal drifts in the AOD 108 may impact the refractive index of the host material 204 and/or the modulation depth of the diffraction grating 206 (e.g., a magnitude of a refractive index variation $\Delta n$ forming the diffraction grating 206). Thermal drifts in the AOD 108 may thus impact the diffraction efficiency of the diffraction grating 206 and the power of the optical beam 106 deflected by the AOD 108.

Figure 5:
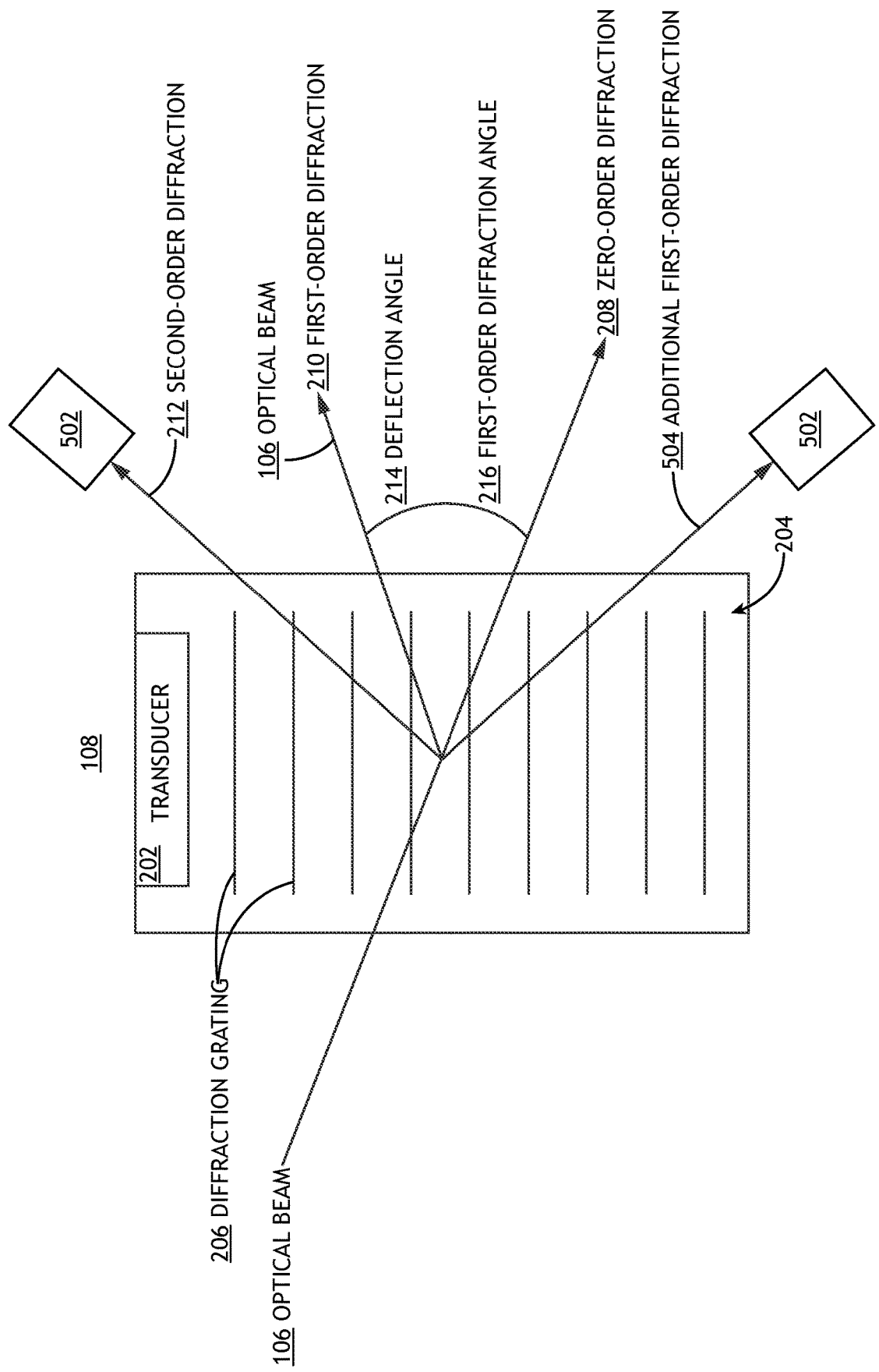
FIG. 5 is a simplified schematic of a portion of the optical scanner including an additional detector for monitoring the performance of the AOD, in accordance with one or more embodiments of the present disclosure.

FIG. 5 is a simplified schematic of a portion of the optical scanner 100 including an additional detector 502 for monitoring the performance of the AOD 108, in accordance with one or more embodiments of the present disclosure. In particular, FIG. 5 is a variation of FIG. 2 such that the descriptions associated with FIG. 2 may be extended to FIG. 5.

In some embodiments, the optical scanner 100 includes at least one additional detector 502 to monitor a power of at least one diffraction order of the optical beam 106 generated by the AOD 108. For example, although the diffraction efficiency of the first-order diffraction 210 by the AOD 108 is typically high (particularly when operating in the Bragg condition), at least some power is typically provided in additional non-zero diffraction orders. For example, at least a few percent of the power of the optical beam 106 may be provided as second-order diffraction 212 and/or an additional first-order diffraction beam 504 having an opposite sign as the first-order diffraction 210 associated with the primary deflection of the optical beam 106. For example, operation in the Bragg condition may provide a substantial portion of the power of the optical beam 106 as first-order diffraction 210 as described with respect to FIG. 2, where the first-order diffraction 210 may be +1 order diffraction or −1 order diffraction based on a selected sign convention. However, it may be the case that at least some smaller portion of the power of the optical beam 106 may be in the additional first-order diffraction beam 504 of the opposite sign.

It is contemplated herein that the additional non-zero diffraction orders may advantageously be physically separated from the main scan range (e.g., the main working window) to provide easy access and does not detract from the power output of the AOD 108. In contrast, some alternative techniques for monitoring thermal drift of an AOD may require injecting an additional weak drive signal to the AOD to generate weak diffraction at a different angle and tracking the stability of this weak diffraction. In some embodiments, such an additional drive signal may obviate the need for a separate dispersive element 122, particularly if this additional drive signal has a higher frequency than the drive signal 136. In this configuration, the detector 124 may be placed to capture dispersed light associated with diffraction from a grating generated by this additional drive signal (e.g., by periodic acoustic waves generated by this additional drive signal).

The controller 110 may then be coupled to the additional detector 502 to monitor the power in the associated non-zero diffraction order. For example, increased power in such a non-zero diffraction order may be indicative of thermal drift of the AOD 108.

In cases where the optical beam 106 exhibits spectral variations, such spectral variations may further impact the power in one or more additional non-zero diffraction orders. In these cases, the controller 110 may isolate the relative impact of thermal drift of the AOD 108 from the spectral variations based on the signals from the one or more detectors 124. For example, spectral variations of the optical beam 106 may typically occur on a shorter timescale than thermal drifts in the AOD 108. Accordingly, power variations of the additional non-zero diffraction orders as measured by the additional first-order diffraction beam 504 that correspond to observable spectral variations may be removed or ignored by the controller 110 such that thermal drifts in the AOD 108 on relatively longer timescales may be monitored.

In some embodiments, the controller 110 is further configured to adjust an amplitude of the drive signal 116 to the AOD 108 based on signals from any of the one more detectors 124. As described previously herein with respect to FIG. 2, the amplitude of the drive signal 116 may control a modulation depth of the induced diffraction grating 206 and may thus control a diffraction efficiency of the optical beam 106. In this way, the controller 110 may adjust the intensity or power of the optical beam 106 deflected by the AOD 108.

In some embodiments, the controller 110 adjusts the amplitude of the drive signal 116 to provide an optical beam 106 with a constant power. It is contemplated herein that the power of the optical beam 106 may fluctuate for various reasons. In any case, the controller 110 may adjust the amplitude of the drive signal 116 to provide an optical beam 106 with a constant power over time.

For example, the power of the optical beam 106 from the optical source 104 may fluctuate. Such power fluctuations may be detected and provided to the controller 110 using any suitable technique. For instance, power fluctuations of the sampled beam 120, which may include a fixed percentage of the power of the optical beam 106 may be monitored using any of the one or more detectors 124.

As another example, the power of the optical beam 106 deflected by the AOD 108 may vary based on thermal drifts of the AOD 108, which may be detected using an additional first-order diffraction beam 504 as described with respect to FIG. 5.

As another example, the power of the optical beam 106 propagating through a wavelength-sensitive polarizing element (e.g., a polarization rotator, a polarizer, a polarizing beamsplitter, or the like) in response to spectral variations of the optical beam 106. Such power fluctuations may be monitored by an additional detector (not shown) and/or may be predicted based on a known wavelength response of the element and the spectral variations of the optical beam 106 as measured by the one or more detectors 124.

Referring again to FIGS. 1A-1B, it is contemplated herein that the controller 110 may generate any of the adjustments described herein (e.g., the frequency and/or amplitude of the drive signal 116 for the AOD 108, the drive signal 136 for the adaptive optical element 134, or the like) using any technique known in the art.

In some embodiments, the controller 110 generates an adjustment using a model and/or a lookup table based on a model. As a non-limiting example in the context of generating a frequency adjustment ($\Delta f$) of the drive signal 116 in response to spectral variations of the sampled beam 120, the relationship between the COM of the spectrally-dispersed sampled beam 120 in a plane of a detector 124 and the associated spectral variation may be determined based on the dispersion of the dispersive element 122 as well as the separation between the dispersive element 122 and the detector 124. Accordingly, the controller 110 may directly calculate a required frequency adjustment ($\Delta f$) based on signals from the detector 124 or may use a look-up table including previously-calculated values.

In some embodiments, the controller 110 generates an adjustment using a control loop (e.g., a PID control loop, or the like) or a machine-learning based technique.

In this configuration, the optical scanner 100 (and/or the system 102) may include one or more detectors (not explicitly shown) to monitor a particular property of the optical beam 106 as feedback. Further, an exact relationship between a parameter to be adjusted and the feedback is not required. Rather, the feedback is used to actively control and/or predict a required adjustment. As a non-limiting example in the context of generating a frequency adjustment ($\Delta f$) of the drive signal 116, feedback from a detector monitoring a position of the optical beam 106 after deflection by the AOD 108 may provide feedback suitable for controlling the value of the frequency adjustment ($\Delta f$). As another non-limiting example in the context of adjusting a power of the optical beam 106, feedback from a detector monitoring a power of the optical beam 106 at a desired position may provide feedback suitable for controlling the amplitude of the drive signal 116. As another non-limiting example in the context of adjusting a spot size of the optical beam 106 (e.g., on a sample 128 as depicted in FIG. 1B), a detector monitoring the spot size may provide feedback suitable for adjusting the drive signal 136 to the adaptive optical element 134.

Figure 6:
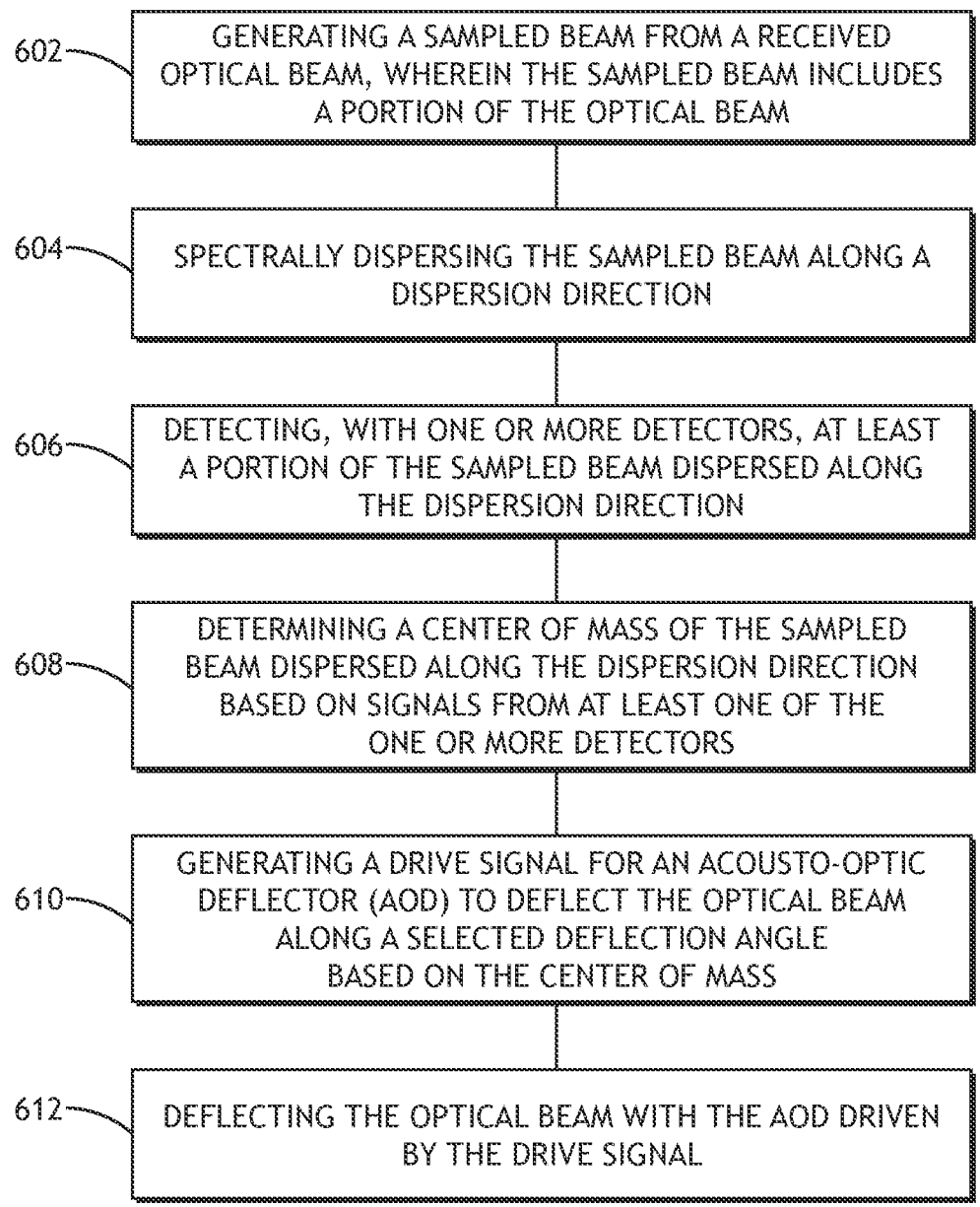
FIG. 6 is a flow diagram illustrating steps performed in a method for dynamic control of an optical scanner, in accordance with one or more embodiments of the present disclosure.

Referring now to FIG. 6, FIG. 6 is a flow diagram illustrating steps performed in a method 600 for dynamic control of an optical scanner, in accordance with one or more embodiments of the present disclosure. Applicant notes that the embodiments and enabling technologies described previously herein in the context of the optical scanner 100 should be interpreted to extend to method 600. It is further noted, however, that the method 600 is not limited to the architecture of the optical scanner 100.

In some embodiments, the method 600 includes a step 602 of generating a sampled beam 120 from a received optical beam 106, wherein the sampled beam 120 includes a portion of the optical beam 106. For example, the step 602 may be implemented with a sampler 118 such as, but not limited to, an optical wedge or a beamsplitter.

In some embodiments, the method 600 includes a step 604 of spectrally dispersing the sampled beam 120 along a dispersion direction 302. For example, the step 604 may be implemented with a dispersive element 122 such as, but not limited to, a prism or a diffraction grating.

In some embodiments, the method 600 includes a step 606 of detecting, with one or more detectors 124, at least a portion of the sampled beam 120 dispersed along the dispersion direction 302.

In some embodiments, the method 600 includes a step 608 of determining a center of mass of the sampled beam 120 dispersed along the dispersion direction 302 based on signals from at least one of the one or more detectors 124.

In some embodiments, the method 600 includes a step 610 of generating a drive signal 116 for an AOD 108 to deflect the optical beam 106 along a selected deflection angle 214 based on the center of mass. Further, in the case of multiple AODs 108 (e.g., providing different scan directions), drive signals 116 may be generated for each of the AODs 108. The drive signals 116 of these AODs 108 may be the same if they operate at the same frequency or may be different if they operate at different frequencies. For instance, operation at different frequencies may be suitable for addressing certain parts of a total 2D field of view.

In some embodiments, the method 600 includes a step 612 of deflecting the optical beam 106 with the AOD 108 driven by the drive signal 116.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical scanner comprising:
   a sampler to receive an optical beam and provide a sampled beam including a portion of the optical beam;
   a dispersive element to spectrally disperse the sampled beam along a dispersion direction;
   one or more detectors configured to receive at least a portion of the sampled beam dispersed along the dispersion direction;
   one or more acousto-optic deflectors (AODs) configured to deflect the optical beam from the sampler; and
   a controller communicatively coupled to at least the one or more AODs and the one or more detectors, the controller including one or more processors configured to execute program instructions causing the one or more processors to:
      determine a center of mass of the sampled beam dispersed along the dispersion direction based on signals from at least one of the one or more detectors; and
      generate a drive signal for at least one of the one or more AODs to deflect the optical beam from the sampler along a selected deflection angle based on the center of mass.

2. The optical scanner of claim 1, wherein generating the drive signal comprises:
   calculating a first frequency of the drive signal to provide the selected deflection angle based on an expected value of the center of mass associated with an expected wavelength of the sampled beam;
   calculating an adjustment frequency based on a deviation of the center of mass of the sampled beam dispersed along the dispersion direction from the expected value of the center of mass; and
   generating the drive signal with a second frequency based on the first frequency and the adjustment frequency.

3. The optical scanner of claim 1, wherein the one or more detectors include a position-sensitive sensor.

4. The optical scanner of claim 3, wherein the position-sensitive sensor comprises:
   a segmented sensor having two or more segments, wherein the center of mass is determinable based on relative intensities of the sampled beam in the two or more segments.

5. The optical scanner of claim 4, wherein the segmented sensor includes two segments distributed along the dispersion direction, wherein the center of mass is determinable based on relative intensities of the sampled beam in the two segments.

6. The optical scanner of claim 4, wherein the segmented sensor includes four segments arranged as quadrants, wherein the center of mass is determinable based on relative intensities of the sampled beam in the four segments.

7. The optical scanner of claim 1, wherein the one or more detectors include a multi-pixel sensor array.

8. The optical scanner of claim 7, wherein the multi-pixel sensor array comprises:
   a line array sensor including a single row of pixels distributed along the dispersion direction.

9. The optical scanner of claim 7, wherein the multi-pixel sensor array comprises:
   an area array sensor including two or more rows of pixels, each row including pixels distributed along the dispersion direction.

10. The optical scanner of claim 1, further comprising:
    an adaptive optical element having an adjustable optical power, wherein the adaptive optical element is configured to receive the optical beam from the one or more AODs, wherein the program instructions are further configured to cause the one or more processors to:

generate an additional drive signal for the adaptive optical element to control the optical power.

11. The optical scanner of claim 10, wherein generating the additional drive signal for the adaptive optical element to control the optical power comprises:
generating the additional drive signal for the adaptive optical element to control the optical power to collimate the optical beam.

12. The optical scanner of claim 10, wherein generating the additional drive signal for the adaptive optical element to control the optical power comprises:
generating the additional drive signal for the adaptive optical element to control the optical power to provide focused spot size of the optical beam when focused with at least one of the adaptive optical element or an additional focusing element.

13. The optical scanner of claim 10, wherein generating the additional drive signal for the adaptive optical element to control the optical power comprises:
generating the additional drive signal for the adaptive optical element to control the optical power based on the center of mass.

14. The optical scanner of claim 10, wherein generating the additional drive signal for the adaptive optical element to control the optical power comprises:
generating, based on signals from at least one of the one or more detectors, the additional drive signal for the adaptive optical element to control the optical power based on a width of the sampled beam dispersed along the dispersion direction.

15. The optical scanner of claim 1, further comprising:
a wavelength-sensitive polarization optic in a path of the optical beam, wherein the program instructions are further configured to cause the one or more processors to:
adjust an amplitude of the drive signal to provide a selected power of the optical beam from the wavelength-sensitive polarization optic and the one or more AODs based on the center of mass.

16. The optical scanner of claim 1, further comprising:
an additional detector configured to receive at least a portion of an additional diffraction order of the optical beam from the one or more AODs;
wherein the program instructions are further configured to cause the one or more processors to:
monitor thermal drifts of the one or more AODs based on a power of the additional diffraction order.

17. The optical scanner of claim 1, wherein the program instructions further cause the one or more processors to:
compare the power of the additional diffraction order to the center of mass; and
isolate the thermal drifts of the one or more AODs from variations of a spectrum of the sampled beam based on the center of mass.

18. The optical scanner of claim 1, wherein the sampler, the dispersive element, and the one or more AODs are configured to operate at wavelength in a range of 9 to 12 micrometers.

19. A system comprising:
an optical source configured to generate an optical beam;
a scanner comprising:
a sampler to receive the optical beam and provide a sampled beam including a portion of the optical beam;
a dispersive element to spectrally disperse the sampled beam along a dispersion direction;
one or more detectors configured to receive at least a portion of the sampled beam dispersed along the dispersion direction;
one or more acousto-optic deflectors (AODs) configured to deflect the optical beam from the sampler;
a controller communicatively coupled to at least the one or more AODs and the one or more detectors, the controller including one or more processors configured to execute program instructions causing the one or more processors to:
determine a center of mass of the sampled beam dispersed along the dispersion direction based on signals from at least one of the one or more detectors; and
generate a drive signal for at least one of the one or more AODs to deflect the optical beam from the sampler along a selected deflection angle based on the center of mass; and
one or more focusing optics configured focus the optical beam deflected by the one or more AODs to a sample.

20. The system of claim 19, wherein the optical source comprises:
a carbon dioxide ($CO_2$) laser source.

21. The system of claim 20, wherein the optical beam has a wavelength in a range of 9 to 12 micrometers, wherein the sampler, the dispersive element, and the one or more AODs are configured to operate at wavelength in the range of 9 to 12 micrometers.

22. The system of claim 19, wherein generating the drive signal comprises:
calculating a first frequency of the drive signal to provide the selected deflection angle based on an expected value of the center of mass associated with an expected wavelength of the sampled beam;
calculating an adjustment frequency based on a deviation of the center of mass of the sampled beam dispersed along the dispersion direction from the expected value of the center of mass; and
generating the drive signal with a second frequency based on the first frequency and the adjustment frequency.

23. The system of claim 19, wherein the one or more detectors include a position-sensitive sensor.

24. The system of claim 23, wherein the position-sensitive sensor comprises:
a segmented sensor having two or more segments, wherein the center of mass is determinable based on relative intensities of the sampled beam in the two or more segments.

25. The system of claim 24, wherein the segmented sensor includes two segments distributed along the dispersion direction, wherein the center of mass is determinable based on relative intensities of the sampled beam in the two segments.

26. The system of claim 24, wherein the segmented sensor includes four segments arranged as quadrants, wherein the center of mass is determinable based on relative intensities of the sampled beam in the four segments.

27. The system of claim 19, wherein the one or more detectors include a multi-pixel sensor array.

28. The system of claim 27, wherein the multi-pixel sensor array comprises:
a line array sensor including a single row of pixels distributed along the dispersion direction.

29. The system of claim 27, wherein the multi-pixel sensor array comprises:

an area array sensor including two or more rows of pixels, each row including pixels distributed along the dispersion direction.

30. The system of claim 19, further comprising:
an adaptive optical element having an adjustable optical power, wherein the adaptive optical element is configured to receive the optical beam from the one or more AODs, wherein the program instructions are further configured to cause the one or more processors to:
generate an additional drive signal for the adaptive optical element to control the optical power.

31. The system of claim 30, wherein generating the additional drive signal for the adaptive optical element to control the optical power comprises:
generating the additional drive signal for the adaptive optical element to control the optical power to collimate the optical beam.

32. The system of claim 30, wherein generating the additional drive signal for the adaptive optical element to control the optical power comprises:
generating the additional drive signal for the adaptive optical element to control the optical power to provide focused spot size of the optical beam when focused with at least one of the adaptive optical element or an additional focusing element.

33. The system of claim 30, wherein generating the additional drive signal for the adaptive optical element to control the optical power comprises:
generating the additional drive signal for the adaptive optical element to control the optical power based on the center of mass.

34. The system of claim 30, wherein generating the additional drive signal for the adaptive optical element to control the optical power comprises:
generating, based on signals from at least one of the one or more detectors, the additional drive signal for the adaptive optical element to control the optical power based on a width of the sampled beam dispersed along the dispersion direction.

35. The system of claim 19, further comprising:
a wavelength-sensitive polarization optic in a path of the optical beam, wherein the program instructions are further configured to cause the one or more processors to:
adjust an amplitude of the drive signal for the AOD to provide a selected power of the optical beam from the wavelength-sensitive polarization optic and the AOD based on the center of mass.

36. The system of claim 19, further comprising:
an additional detector configured to receive at least a portion of an additional diffraction order of the optical beam from the AOD;
wherein the program instructions are further configured to cause the one or more processors to:
monitor thermal drifts of the AOD based on a power of the additional diffraction order.

37. The system of claim 19, wherein the program instructions further cause the one or more processors to:
compare the power of the additional diffraction order to the center of mass; and
isolate the thermal drifts of the AOD from variations of a spectrum of the sampled beam based on the center of mass.

38. A method comprising:
generating a sampled beam from a received optical beam, wherein the sampled beam includes a portion of the optical beam;
spectrally dispersing the sampled beam along a dispersion direction;
detecting, with one or more detectors, at least a portion of the sampled beam dispersed along the dispersion direction;
determining a center of mass of the sampled beam dispersed along the dispersion direction based on signals from at least one of the one or more detectors;
generating a drive signal for an acousto-optic deflector (AOD) to deflect the optical beam along a selected deflection angle based on the center of mass; and
deflecting the optical beam with the AOD driven by the drive signal.

39. The method of claim 38, further comprising:
generating an additional drive signal for an adaptive optical element to at least one of collimate or focus the optical beam based on at least one of the center of mass or a width of the sampled beam dispersed along the dispersion direction.

* * * * *